Patented Jan. 12, 1926.

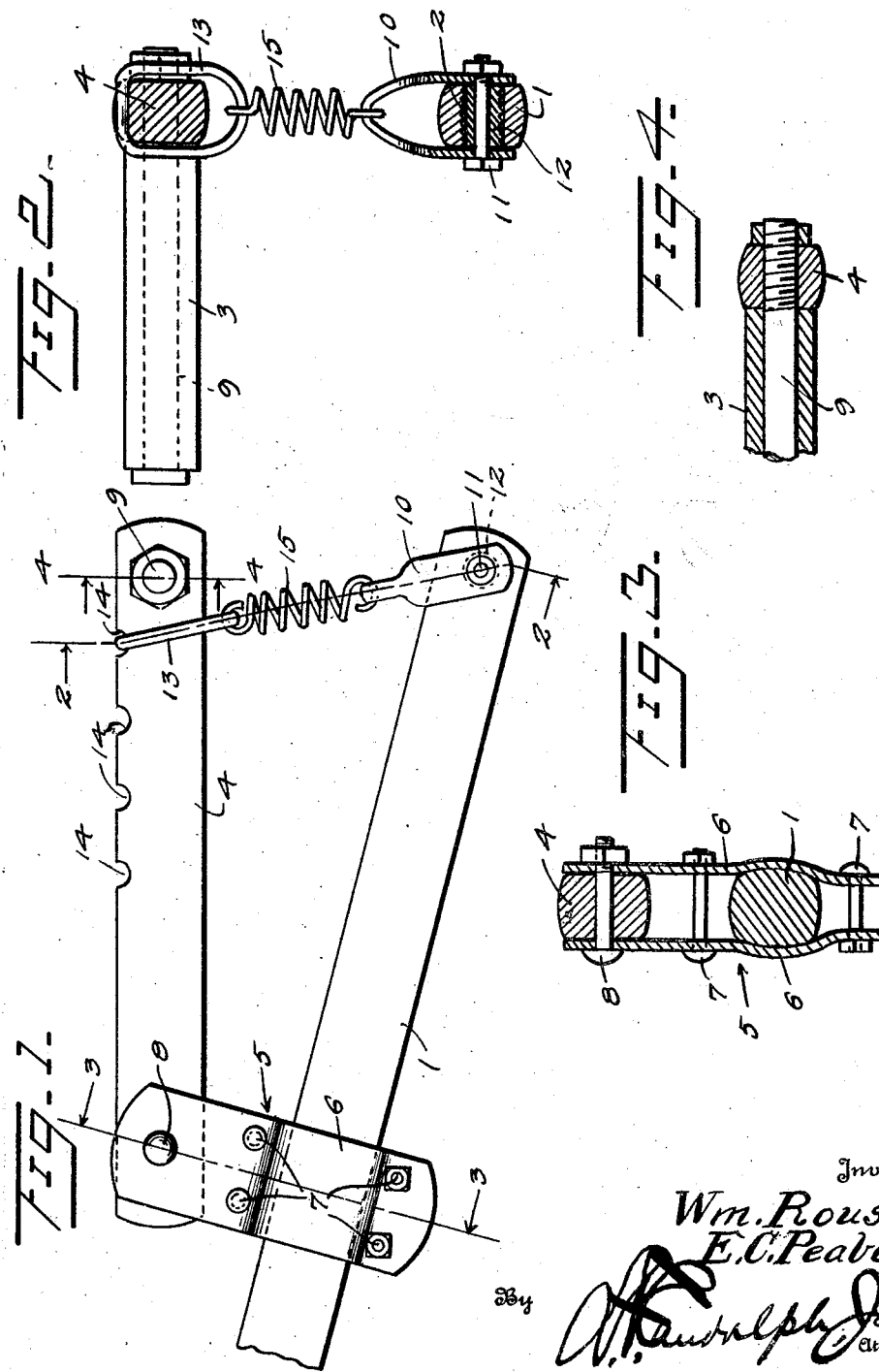

1,569,672

UNITED STATES PATENT OFFICE.

ELMER C. PEABODY AND WILLIAM ROUSE, OF DILLON, COLORADO.

SHOCK ABSORBER FOR HAND CRANKS.

Application filed June 23, 1925. Serial No. 39,137.

*To all whom it may concern:*

Be it known that we, ELMER C. PEABODY and WILLIAM ROUSE, citizens of the United States, residing at Dillon, in the county of Summit and State of Colorado, have invented certain new and useful Improvements in Shock Absorbers for Hand Cranks; and we do hereby declare the following to be a full, clear, and exact description of the invention, such as will enable others skilled in the art to which it appertains to make and use the same.

This invention relates to hand cranks for cream separators and other machines, and has for one of its objects the provision of novel and simple means through the medium of which a handle can be yieldingly connected to a crank in order to cause the application of uniform power impulses to each and every phase of rotation of the crank, and in order to prevent the gearing of the machine from being subjected to strain during the starting and the operation of the machine.

The foregoing and other objects are attained by the construction, combination and arrangement of parts hereinafter fully described and claimed, and illustrated in the accompanying drawing, wherein:

Figure 1 is an elevational view illustrating the application of our invention;

Figure 2 is a sectional view taken on the plane indicated by the line 2—2 of Figure 1;

Figure 3 is a sectional view taken on the plane indicated by the line 3—3 of Figure 1, and Figure 4 is a detail sectional view taken on the plane indicated by the line 4—4 of Figure 1.

Corresponding and like parts are referred to in the following description, and designated in the several views of the accompanying drawing, by similar reference characters.

In the drawing 1 indicates the hand crank of a cream separator or other machine, and as shown the hand crank is provided with a screw threaded opening 2 for the reception of the threaded end of the handle-retaining bolt.

In accordance with my invention, the handle 3 with which the crank 1 is equipped, is removed therefrom and connected to a lever or auxiliary crank 4 which is pivoted and yieldingly connected to the main crank 1. The auxiliary crank 4 is shorter than the main crank 1, and is arranged in the plane of the main crank. The inner end of the auxiliary crank 4 is pivotally connected to the main crank 1 by a bracket 5 which comprises similar members 6 secured to the opposite sides of the main crank 1 by bolts 7. The inner end of the auxiliary crank 4 is positioned between and pivoted to the bracket members 6 by a bolt 8. The handle 3 is secured to the outer or free end of the auxiliary crank 4 by a bolt 9. A clevis 10 is pivotally connected to the outer or free end of the main crank 1 by a bolt 11 which passes through a bushing 12 located in the opening 2 of said crank. A link 13 embraces the auxiliary crank 4, and to permit it to be retained thereon at different distances from the pivot 8 the crank is provided in its upper edge with notches 14 for the reception of the upper cross member of the link. A spring 15 is connected at its lower end to the clevis 10 and at its upper end to the link 13.

As the auxiliary crank 4 is pivoted and yieldingly connected to the main crank 1, the inertia of the main crank and the moving parts associated therewith can only be overcome gradually, and due thereto said parts cannot be subjected to shocks and jars during the starting of the machine. Furthermore, the pivoted and yielding connection of the auxiliary crank 4 with the main crank 1 causes the application of uniform power impulses to each and every phase of rotation of the crank shaft and the moving parts associated therewith, and due thereto no shocks or jars can be imparted to said parts during the operation of the machine.

From the foregoing description, taken in connection with the accompanying drawing, the advantages of the construction and of the method of operation will be readily apparent to those skilled in the art to which the invention appertains. While we have described the principle of operation of the invention, together with the device which we now consider to be the best embodiment thereof, we desire to have it understood that the device shown is merely illustrative, and that such changes may be made when desired as are within the scope of the invention as claimed.

What is claimed is:

1. A device of the character set forth, comprising a main crank, an auxiliary crank, means pivotally connecting the auxiliary crank to the main crank, a clevis pivoted to the main crank, a link adjustably connected to the auxiliary crank, a spring connected to the clevis and link, and a handle connected to the auxiliary crank.

2. A device of the character set forth, comprising a main crank, a bracket secured to the main crank, an auxiliary crank pivotally connected to the bracket, a spring connected to both cranks, and a handle connected to the auxiliary crank.

3. A device of the character set forth, comprising a main crank, an auxiliary crank provided with relatively spaced notches, means pivotally connecting the auxiliary crank to the main crank, a link engaging in one of the notches of the auxiliary crank, and a spring connected to said link and main crank.

In testimony whereof we affix our signatures.

ELMER C. PEABODY.
WILLIAM ROUSE.